(12) United States Patent
Laitila et al.

(10) Patent No.: US 8,020,816 B2
(45) Date of Patent: Sep. 20, 2011

(54) INFORMATION TRANSFER DEVICE SUPPORT STAND

(75) Inventors: Andy Laitila, Peterborough (CA); Mika Laitila, Peterborough (CA)

(73) Assignee: Laicor Fixtures, Inc., Peterborough (CA)

( * ) Notice: Subject to any disclaimer, the term of this patent is extended or adjusted under 35 U.S.C. 154(b) by 99 days.

(21) Appl. No.: 11/668,332

(22) Filed: Jan. 29, 2007

(65) Prior Publication Data

US 2008/0042020 A1 Feb. 21, 2008

Related U.S. Application Data

(60) Provisional application No. 60/762,878, filed on Jan. 30, 2006.

(51) Int. Cl.
*F16M 11/00* (2006.01)
*A47F 5/12* (2006.01)

(52) U.S. Cl. .................. 248/125.7; 248/125.9; 248/919; 16/342; 16/343; 16/374

(58) Field of Classification Search .................. 248/121, 248/125.1, 125.7, 125.8, 127, 131, 132, 133, 248/125.9, 370, 371, 917–921; 224/548, 224/929, 939; 361/680–683, 679, 686; 16/332–335, 16/337, 343, 361, 363, 374
See application file for complete search history.

(56) References Cited

U.S. PATENT DOCUMENTS

| | | | | |
|---|---|---|---|---|
| 4,923,154 A | * | 5/1990 | Konkel | 248/131 |
| D309,307 S | * | 7/1990 | Sigurdson | D14/251 |
| 5,187,744 A | * | 2/1993 | Richter | 379/449 |
| D356,074 S | * | 3/1995 | Coblentz et al. | D14/457 |
| 5,751,548 A | * | 5/1998 | Hall et al. | 361/686 |
| 6,158,793 A | * | 12/2000 | Castro | 296/1.07 |
| 6,427,288 B1 | * | 8/2002 | Saito | 16/361 |
| 6,539,358 B1 | * | 3/2003 | Coon et al. | 704/275 |
| 2006/0016945 A1 | * | 1/2006 | Taylor | 248/188.5 |

FOREIGN PATENT DOCUMENTS

| | | |
|---|---|---|
| CA | 2189816 | 1/2001 |
| CA | 2189819 | 1/2001 |

* cited by examiner

*Primary Examiner* — Tan Le
(74) *Attorney, Agent, or Firm* — Smith, Gambrell & Russell, LLP

(57) ABSTRACT

Disclosed herein are support stands for information transfer devices. There is provided a support stand for an information transfer device comprising a hollow mast having a first end and a second end, the first end comprising a bracket attached to one or more walls of the mast, the second end comprising a base member for attachment to a surface; a rotatable member affixed to the hollow mast and secured to the bracket by a connector means, the rotatable member capable of rotational movement between a first position and a second position; the rotatable member comprising an information transfer device holder for supporting an information transfer device and a security shield for preventing unauthorized viewing of confidential information during input into the information transfer device.

15 Claims, 13 Drawing Sheets

INFORMATION TRANSFER DEVICE SUPPORT STAND

CROSS REFERENCE TO RELATED APPLICATIONS

This application claims the benefit of U.S. Provisional Patent Application No. 60/762,878, filed 30 Jan. 2006, which is herein incorporated by reference in its entirety.

FIELD OF INVENTION

The present invention relates to information transfer device holders.

BACKGROUND OF THE INVENTION

The use of electronic information transfer devices in our society is widespread. Point of sale terminals in stores and other establishments are used to pay for goods and services. A variety of platforms and information transfer device holders are known in the art.

CA 2,189,816 discloses a sales terminal keyboard platform for use in a store or retail establishment. The platform comprises a rotary bearing incorporated into the mast. The bearing within the mast permits the mast to rotate. In such a case, it can be difficult for the owner of a store or retail establishment to change the frictional resistance during rotation of the mast. Also, if there is a problem with rotation, it may be necessary to access the mast in order to replace one or more worn or defective parts in the bearing. It is also suggested that the sales terminal keyboard platform may comprise a fixed privacy screen or the screen may be mounted on a radius arm pivotably mounted below the platform. The latter case results in a more complicated apparatus that may obstruct purchasers or service users.

There is a need in the art to for novel support stands for information transfer devices.

SUMMARY OF THE INVENTION

The present invention relates to information transfer device holders.

The present invention provides a support stand for an information transfer device comprising, a hollow mast having a first end and a second end, the first end comprising a bracket attached to one or more walls of the mast, the second end comprising a base member for attachment to a surface, a rotatable member affixed to the hollow mast and secured to the bracket by a connector means, the rotatable member capable of rotational movement between a first position and a second position, the rotatable member comprising an information transfer device holder for supporting an information transfer device and a security shield for preventing unauthorized viewing of confidential information during input into the information transfer device.

The present invention further provides a support stand for an information transfer device as described above wherein the bracket comprises an insert bracket attached to one or more interior walls of the mast.

The present invention further provides a support stand for an information transfer device as described above wherein the base member comprises a substantially flat portion comprising a plurality of apertures for passage of securing means, and at least one other aperture for passage of one or more cables or wires.

The present invention further provides a support stand for an information transfer device as described above wherein the mast and base member comprise a single continuous piece of material.

The present invention further provides a support stand for an information transfer device as described above wherein the mast has a telescoping means or telescoping insert for modulating the length of the mast.

The present invention further provides a support stand for an information transfer device as described above wherein the insert bracket is attached in transverse orientation to the long axis of the mast at or near the end opposite the base member by one or more securing means.

The present invention further provides a support stand for an information transfer device as described above wherein the connector means attaching the rotatable member to the insert bracket comprises a threaded screw, one or more nuts, one or more bolts, one or more spacers, one or more washers, or any combination thereof.

The present invention further provides a support stand for an information transfer device as described above wherein the connector means passes through an aperture on each of the rotatable member and insert bracket, the rotatable member and insert bracket secured to each other by at least one locking nut and at least one friction washer.

The present invention further provides a support stand for an information transfer device as described above wherein the bracket is mounted on the exterior of the hollow mast.

The present invention further provides a support stand for an information transfer device as described above wherein the rotatable member comprises a second aperture optionally with a removable plug or insert for passage of wires or cables through the rotatable member close to the axis of rotation thereof. It is also contemplated that the second aperture communicates with a slot to the periphery of the rotatable member.

The present invention further provides a support stand for an information transfer device as described above wherein the rotatable member is restricted to a defined angle of rotation by one or more bosses, protruding elements, or extending members that extend downwardly from the rotatable member and engage one or more stopping members in the mast.

The present invention further provides a support stand for an information transfer device as described above wherein the rotatable member comprises one or more screws that extend downwardly into the hollow mast, the screws abutting one or more portions of the insert bracket when the rotatable member is rotated through a defined angle of rotation.

The present invention further provides a support stand for an information transfer device as described above wherein the rotatable member comprises an information transfer device holder defining a slot comprising a back portion, a first side portion, a second side portion, a bottom portion and a front portion.

The present invention further provides a support stand for an information transfer device as described above further comprising a security shield attached thereto.

The present invention further provides a support stand for an information transfer device as described above wherein the rotatable member comprises a pivot or hinge means for tilting a portion of the rotatable member through an angle of rotation.

The present invention further provides a support stand for an information transfer device comprising a rigid, substantially cylindrical hollow mast having a first end and a second end, the first end comprising an insert bracket attached to two interior walls at about opposite positions along the diameter of the mast, and a second end comprising a base member for attachment to a surface, the base member comprising a substantially flat portion with one or more apertures for receiving one or more securing means, and at least one separate aperture for the passage of one or more cables;

a rotatable member comprising an aperture for passing through of wires and cables, a removable grommet inserted therein, and optionally, a removable insert or plug for occupying the aperture when no cables or wires pass through the rotatable member;

the rotatable member affixed exterior the hollow mast and secured to the insert bracket by a connection means, the connection means comprising a threaded screw, one or more locking nuts, bolts, washers, spacers, or any combination thereof, and wherein the threaded screw passes through an aperture in the rotatable member such that the member is provided with rotational movement between a first position and a second position, the rotatable member comprising attachment points for attaching an information transfer device holder for supporting an information transfer device, the holder comprising a back portion, three side portions, a front portion and further comprising an attachable shield for preventing unauthorized viewing of confidential information during input into the information transfer device.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

Figure 1:
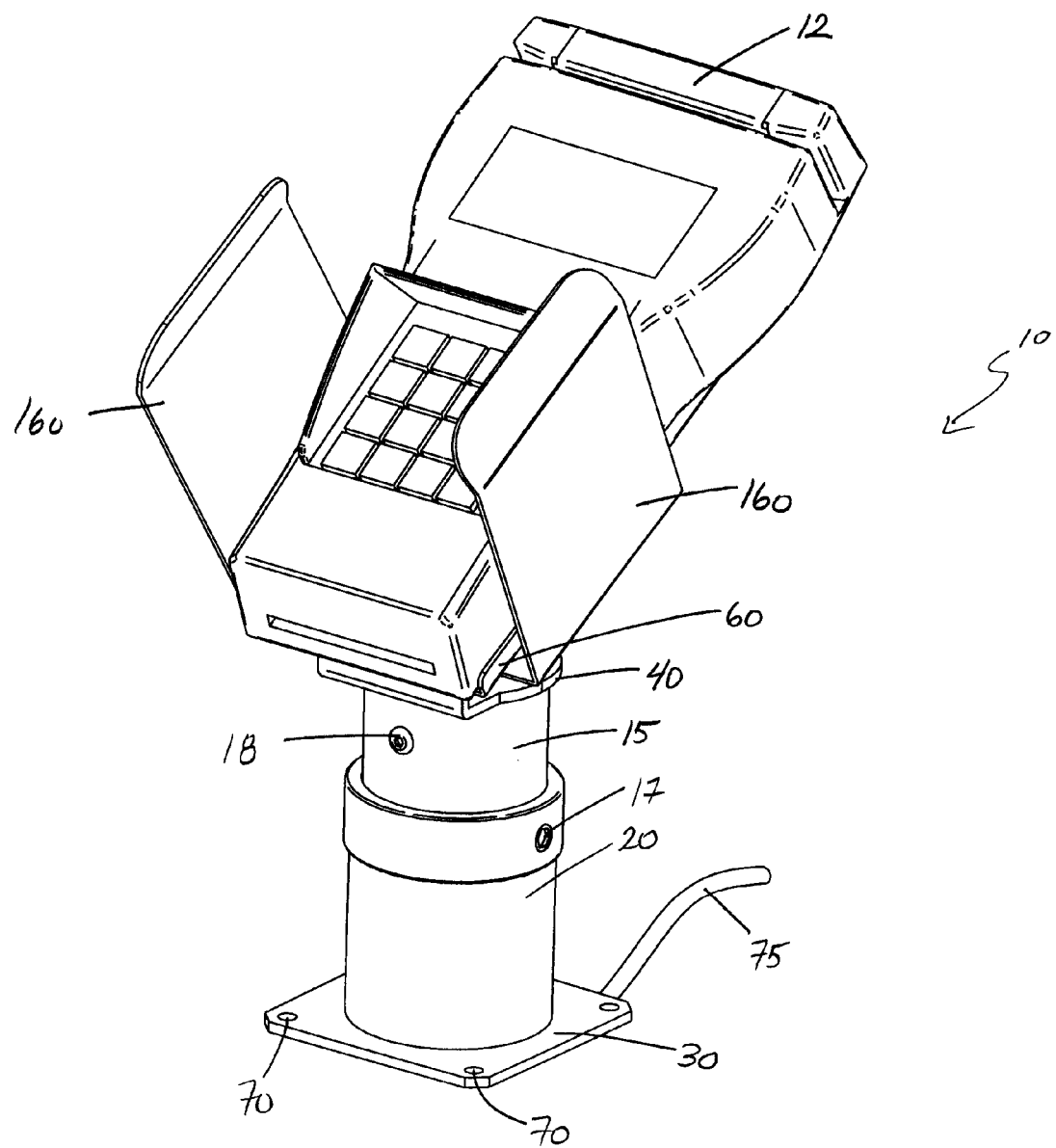
FIG. 1 shows a perspective view of an embodiment of a support stand for an information transfer device comprising an information transfer device.

The present invention relates to information transfer devices holders.

The following description is of a preferred embodiment.

According to the present invention, there is provided a support stand for an information transfer device comprising, a hollow mast having a first end and a second end, the first end comprising a bracket attached to one or more walls of the mast, the second end comprising a base member for attachment to a surface, a rotatable member affixed to the hollow mast and secured to the bracket by a connector means, the rotatable member capable of rotational movement between a first position and a second position, the rotatable member comprising an information transfer device holder for supporting an information transfer device and a security shield for preventing unauthorized viewing of confidential information during input into the information transfer device.

According to a further embodiment of the present invention, there is provided a support stand for an information transfer device comprising, a hollow mast having a first end and a second end, the first end comprising an insert bracket attached to one or more interior walls of the mast, the second end comprising a base member for attachment to a surface, a rotatable member affixed outside the hollow mast and secured to the insert bracket by a connector means, the rotatable member capable of rotational movement between a first position and a second position, and;

the rotatable member further comprising an information transfer device holder for supporting an information transfer device.

By the term "information transfer device" it is meant any point of sale device, electronic funds transfer device, telephone, fax machine, computer terminal, or any other device that may receive input of personal and/or confidential information.

The support stand may be used in a variety of locations for example, but not limited to stores or other retail establishments, service providers including government buildings, banks, medical and dental buildings or in remote locations, for example, buildings or mall kiosks and the like, or wherever there is a need for a person to enter confidential information into an information transfer device. Examples of personal or confidential information may include without limitation, entering a personal identification number (PIN number) for a bank or credit card, entering the account number of an asset, entering a social security number, birthdate or the like.

In use, typically the base member is secured to a counter, floor or rail. The support stand comprising the information transfer device can be selectively rotated between at least two positions, for example, a first position wherein the information transfer device is for use by a store person, retail clerk, service provider or the like, and a second position wherein the information transfer device is for use by a second person, for example, a customer, service user or the like.

In a preferred embodiment, the support stand for an information transfer device comprises a mast extending from a base member. The base member comprises a substantially flat portion comprising a plurality of apertures formed therein for passage of securing means, for example, but not limited to threaded or non threaded securing means including, but not limited to, screws, pins, cotterpins, nails, bolts, cotterpins, washers, clamp, etc for mounting the base member to a suitable surface such as a floor, table top, counter, rail or the like.

In a preferred embodiment, the mast is a substantially hollow, generally cylindrical or tubular member with a circular cross-sectional area less than that of the base member which is preferably rectangular or square. The base member preferably comprises an aperture in each corner for receiving a suitable securing means as described above. Further, the base member usually, but not always comprises an aperture for passage of cables or wires into or out of the hollow mast.

By the term "cables or wires", it is meant any electronic or non-electronic cable or wire including without limitation power cords, telephone wires or lines, computer cables and wires, fiber optic cables, security cables, and the like. In embodiments wherein the base member does not comprise an aperture for passage of cables, it is contemplated that the mast may comprise one or more apertures along its length to permit such cables to pass into or exit from the hollow mast.

In use, typically the base member is secured to a horizontal surface and the hollow mast extends upwards therefrom. In a preferred embodiment, the mast extends about vertically from the horizontally mounted base member.

The mast and base member may form a single continuous piece of material or alternatively, the base member may comprise a separate piece from the mast. In the latter case, the mast may be secured to the base member via one or any number of methods known in the art. Without wishing to be limiting, the mast may be welded to the base member, screwed into the base member, or slots within either the base member or mast may receive and engage one or more reciprocal engaging means in the other. Reciprocal engaging means may include one or more bosses, protruding elements, studs or the like that engage one or more slots, slits, grooves or the like. Further, it is contemplated that the mast and base member may be secured by one or more securing means including, but not limited to cotterpins, screws, nails, washers, bolts, latches or any combination thereof. In a preferred embodiment, the mast is secured so that it is incapable of rotation in relation to the base member, or a surface when attached thereto.

Although it is generally preferred that the support stand comprises a mast with a base member, it is also contemplated that the support stand may comprise a mast without a base member. In such an embodiment, some other portion of the mast may serve as an attachment point to a suitable surface.

In a preferred embodiment, the mast is a substantially hollow, tubular member and thus can serve as a conduit for cables and wires leading to and from the information transfer device. A suitable aperture in the base member also ensures uninterrupted passage of cables and wires in and out of the support stand for an information transfer device.

It is also contemplated that the mast may comprise a telescoping means or telescoping insert to permit the support stand for an information transfer device to be adjusted to a specific height. For example, the mast may comprise two or more overlapping pieces capable of sliding or extending relative to each other thereby increasing the length of the mast. The two or more overlapping pieces may be fixedly attached to each other to prevent the extended mast from collapsing using any means known in the art or as described herein. In an embodiment of the present invention, which is not meant to be limiting, the two or more overlapping pieces may be secured in relation to each other by one or more set screws, tension knobs, clamping mechanisms or any combination thereof.

In a preferred embodiment, an insert bracket is attached within the cavity of the substantially hollow, tubular mast in transverse orientation to the long axis thereof and at or near the end opposite the base member. The insert bracket engages at least one inner wall of the mast and is fixedly attached thereto by at least one or more securing means, for example, but not limited to screws, welding or the like. In a preferred embodiment, the insert bracket extends along the diameter of the cylindrical axis of the mast and is attached at about opposite wall positions.

In an embodiment of the present invention, the insert bracket provides an attachment point for a rotatable member via a connector means. Without wishing to be limiting in any manner, the connector means may comprise a threaded screw, bolt, one or more nuts including locking nuts, one or more spacers including plastic and metal spacers, one or more washers, including, but not limited to lock washers, friction washers and the like made from plastic, for example, nylon or the like, brass, copper or any other suitable metal or non-metal material as known in the art, a bearing, or a combination thereof.

In an embodiment that is not meant to be limiting in any manner, the rotatable member is attached to the insert bracket by a threaded screw that passes through an aperture on the rotatable member. Preferably, the connector means passes through the axis of rotation of the rotatable member. On at least one end of the threaded screw is a locking nut and friction washer that may be tightened sufficiently to provide for rotation of the rotatable member with a requisite degree of frictional resistance. This type of embodiment provides a simple means of regulating the frictional resistance of the rotating member ensuring that the rotatable member does not turn when information is being entered into the information transfer device by a user. Further, a retail establishment or the like may be able to adjust frictional resistance to a desired level, for example, by tightening or loosening a nut on the connector means. The embodiment described is also easy to manufacture and assemble and may result in lower cost of adding a support stand for an information transfer device to a retail establishment, service provider or the like.

It is also contemplated that the insert bracket may comprise a threaded screw or other non-threaded means that allows the rotatable member to be connected to it. For example, but not wishing to be limiting, the insert bracket may comprise a pressed stud with a threaded end that passes through the aperture in the rotatable member and is attached thereto. In still an alternate embodiment, it is contemplated that the rotatable member may comprise a threaded screw or other non-threaded means that allows the insert bracket to be connected to it. For example, but not wishing to be limiting, the rotatable member may comprise a pressed stud with a threaded end that passes through the aperture in the insert bracket and is attached thereto.

While it is preferred that the insert bracket is attached to one or more interior walls of a hollow mast, it is also contemplated that the insert bracket can be replaced by a bracket that is mounted on one or more exterior walls of the hollow mast. Further, all of the embodiments described in respect of the insert bracket apply in respect of a bracket that is mounted on the exterior walls of the mast.

It is also contemplated that the connector means may employ one or more spacers, washers or a combination thereof to ensure that the rotatable member is attached slightly above the plane of the end of the mast such that rotatable member is capable of rotation without frictionally engaging the end of the mast.

It is also preferred that the rotatable member comprise a circular, substantially flat portion comprising a surface area that is about the same or slightly larger than the cross-sectional area of the end of the mast. In such an embodiment, the rotatable member appears to "cap" the end of the mast.

The rotatable member also comprises a second (cable-passing) aperture optionally with a removable insert for passage of cables or wires into the mast. Further, the second aperture may communicate with a slot to the periphery of the rotatable member. In such an embodiment, the plug of a power cord does not need to pass through the second aperture. Rather, a portion of the power cord communicating with the plug may be inserted into the second aperture via the slot. This provides a neater appearance and also reduces the surface area of the rotatable member and/or cross-sectional area of the mast required for the passage of power cords.

In a preferred embodiment, the second aperture (optionally with a removable aperture plug or insert) comprises a removable grommet therein, or has smooth edges or rounded corners. More preferably, the second aperture is close to the axis of rotation of the rotatable member thereby reducing movement of the cable or wires during rotation of the rotatable member and thus minimizing the potential for the wires to become tangled, strained, stretched, frayed, torn, ripped, kinked, pinched or the like, as they pass through the rotatable member into the mast. Preferably, the rotatable member is substantially flat and circular, and the second aperture for passage of cables is located, less than half the radius away from the axis of rotation of the rotatable member, more preferably less than one quarter the radius away from the axis of rotation, even more preferably less than one eight the radius away from the axis of rotation of the rotatable member.

The rotatable member may rotate above a fixed mast by an amount of about 10° to about 360°, for example, but not limited to 10°, 20°, 30°, 40°, 45°, 50°, 60°, 70°, 80°, 90°, 100°, 120°, 140°, 150°, 180°, 190°, 200°, 220°, 250°, 270°, 300°, 320°, 340°, 350°, or about 360°. Further, the amount of rotation may be defined by a range of any two of the values listed above.

In a preferred embodiment, the rotatable member rotates above a fixed mast by about 180°. The rotatable member may be restricted to a defined angle of rotation, for example, but not limited to, by one or more bosses, protruding elements, extending members or the like that extend downwardly from the rotatable member and engage stopping members, for example, one or more portions of the insert bracket within the mast, or one or more stopping members that extend outwardly from within the hollow mast. In an embodiment of the present invention, which is not meant to be considered limiting in any manner, the rotatable member may comprise two members, for example, but not limited to two screws that extend downwardly into the hollow mast, the screws abutting two portions of the insert bracket positioned within the mast when the rotatable member is rotated through about 180 degrees.

The rotatable member may comprise an information transfer device holder or the rotatable member and information transfer device holder may comprise different pieces. For example, the rotatable member may comprise a first portion that is substantially flat and generally circular, and at least one other portion (i.e. a second portion) that extends from the substantially flat plane, optionally bending one or more times along its length to provide an attachment point for an information transfer device holder (ITD holder). The second portion may comprise one or more apertures through which the ITD holder may be attached to the rotatable member for example, by one or more fasteners or securing means, including for example, but not limited to screws, washers, rivets, bolts, nuts, locking nuts or the like.

It is also contemplated that the second portion of the rotatable member may comprise a slot or groove for passage of cables via the cable-passing aperture on the rotatable member to an information transfer device in the holder.

The ITD holder generally comprises a slotted or cradle-like holder to support or attach an information transfer device. A variety of ITD holders may be used and the specific holders described herein are not meant to limit the invention.

In a preferred embodiment, the ITD holder comprises a back portion, two side portions (a first side portion, and a second side portion), a bottom portion and a front portion. The front portion may be a partial front portion continuous with the bottom portion, side portions or both, such that when an ITD terminal is placed in the ITD support stand, the stand overlaps at least a portion of most of the sides of the ITD. It is preferable that the front portion is sized and shaped to be unrestrictive when the magnetic strip on a bank card, credit card or the like is swiped on the information transfer device.

Each of the two side portions of the ITD holder may comprise attachment means or attachment points for reversibly attaching a security shield thereto. In an embodiment of the present invention, one or both of the side portions of the ITD holder may comprise one or more apertures through which one or more screws, nuts, pins, bolts or any combination thereof may be used to attach the security shield to the side portion of ITD holder. In a preferred embodiment, the security shield and attachment means comprises at least two threaded members capable of passing through two apertures in a side portion of the ITD holder. A locking member, such as, but not limited to a nut or locking nut is employed to secure the shield to the side portion of the ITD holder. It is also possible that the shield may be detached from the side portion of the ITD holder and reattached on the other side portion portion of the ITD holder. In such a manner, a store retailer, checkout person or other service provider may adapt the ITD holder as required for customer lines passing from right to left or left to right. In still a further embodiment, it is contemplated that the ITD may comprise one or a plurality of security screens, for example, but not limited attached to one or more side portions, bottom portions, back portions or front portions of the ITD holder as required.

In an alternate embodiment, which is not meant to be limiting in any manner, the ITD holder may comprise a back portion and two extending side members that can also serve as security shields.

The ITD holder may further comprise one or more apertures, slots or grooves in any portion thereof for the passage of cables or wires to and from an information transfer device.

The ITD holder may also comprise two or more information transfer device engaging members, for example such as clips or the like that engage the device and prevent the device from moving substantially during use. In a preferred embodiment, the clips extend from the side portions and prevent the information transfer device from moving substantially during normal use.

It is also contemplated that the rotatable bracket, or ITD holder may comprise a pivot or hinge means for tilting a portion of the rotatable member, the ITD holder or both through a defined angle of rotation. In such an embodiment the holder may rotate about a first axis via the rotatable member, and a second axis, preferably about perpendicular to the first axis via the pivot or hinge means. A pivot or a hinge means may comprise any pivot means or hinge means known in the art, for example, but not limited to one or more screws, bolts, nuts, bearings or washers, including, but not limited to lock washers, friction washers or the like, or any combination thereof. Preferably, the pivot or hinge means may be adjusted, for example, by tightening so that an appropriate amount of frictional resistance is provided when tilting the holder. Also it is to be understood that the total rotation afforded by tilting a portion of the rotatable member or ITD holder may be the same as that described previously for the rotation of the rotatable member. More preferably, the holder may be tilted by about 10°, 20°, 30°, 40°, 50°, 60°, 70°, 80° or 90° or a range defined by any two of the values listed above.

The mast, base member, rotatable member, insert bracket, information transfer device holder, security shield, etc may be manufactured from the same material or different materials, for example, steel, iron, aluminum, plastic or any combination thereof.

The present invention will be further illustrated in the following examples, which are not meant to be limiting in any manner.

Examples

Referring now to FIG. 1, there is shown a representative embodiment of the support stand for an information transfer device (10) comprising an information transfer device (12). The support stand (10) comprises mast (20) and telescoping insert (15) connected by set screw (17). Also shown is base member (30), base member apertures (70), hexagonal screw (18) for attaching the insert bracket (not shown) to the mast, rotatable member (40) providing for rotation of information transfer device holder (60), security shields (160) and information transfer device (12). Also shown in FIG. 1, is cable (75) that passes through an aperture (not shown) in base member (30). The cable also passes through the hollow mast, exists through the rotatable member and attaches to information transfer device (12).

Figure 2:
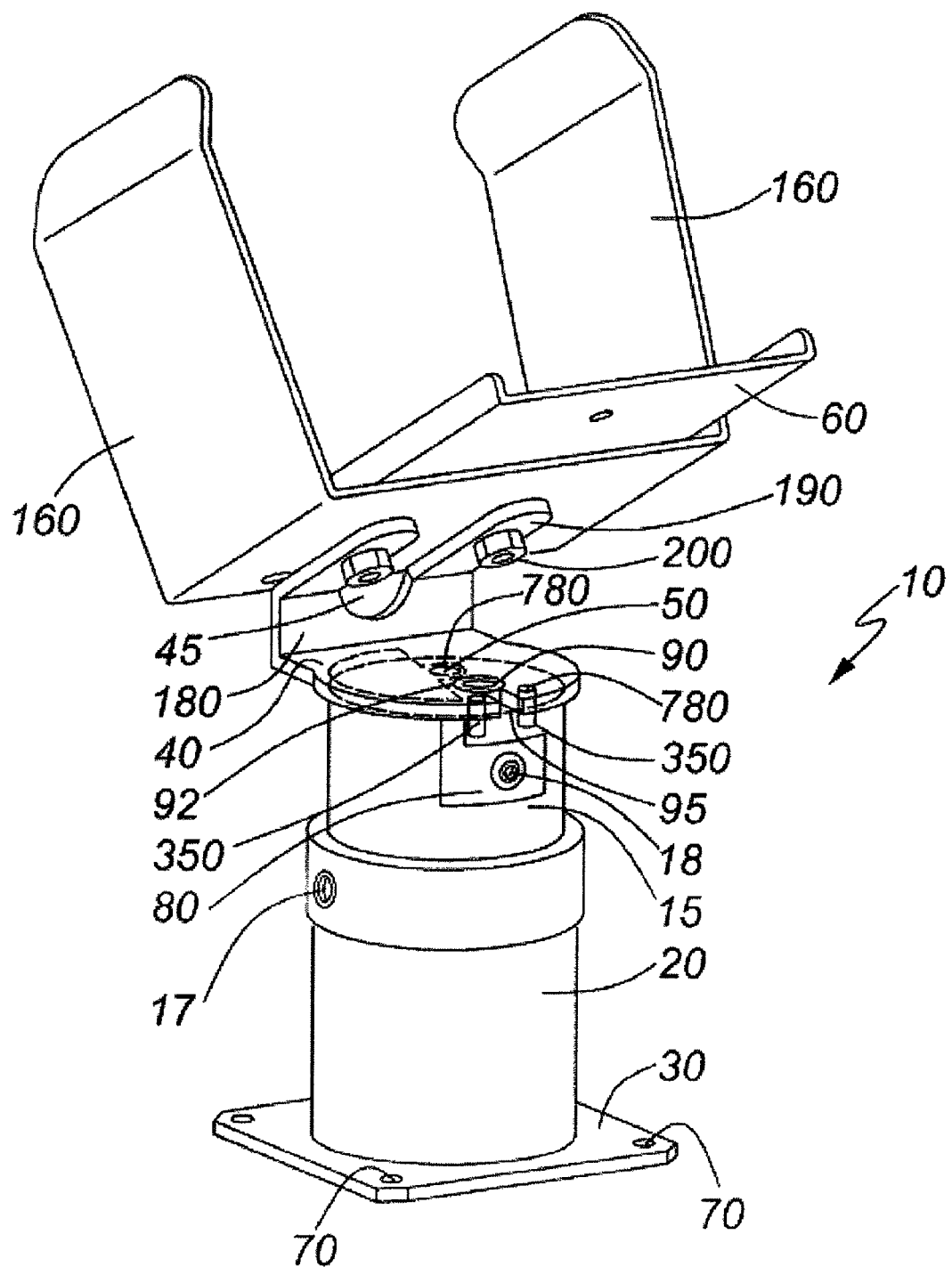
FIG. 2 shows a perspective view of an embodiment of support stand for an information transfer device.

Referring now to FIG. 2, there is shown a representative embodiment of the support stand for an information transfer device (10) without an information transfer device. The support stand (10) comprises mast (20) and telescoping insert (15) connected by set screw (17). Also shown is base member (30), base member apertures (70), hexagonal screw (18) for attaching the insert bracket (not shown) to the mast, rotatable member (40) providing for rotation of the information transfer device holder (60) that attaches to the rotatable member via one or more attachment points (190) for an IFD holder and nuts (200) for securing threaded screws passing through from the IFT holder. Also shown is aperture (50) in rotatable member (40) which can receive a connector means (not shown). The connector means may comprise, but is not limited to a pressed threaded stud, screw or the like for securing the rotatable member to the insert bracket (not shown). Also shown in the figure is the second (cable-passing) aperture (90) having a removable grommet (92) therein, the second aperture communicating with a slot (95) to the periphery of the rotatable member, a second portion (180) of the rotatable member also comprising a slot (45) therein for passage of cables or wires.

Figure 3:
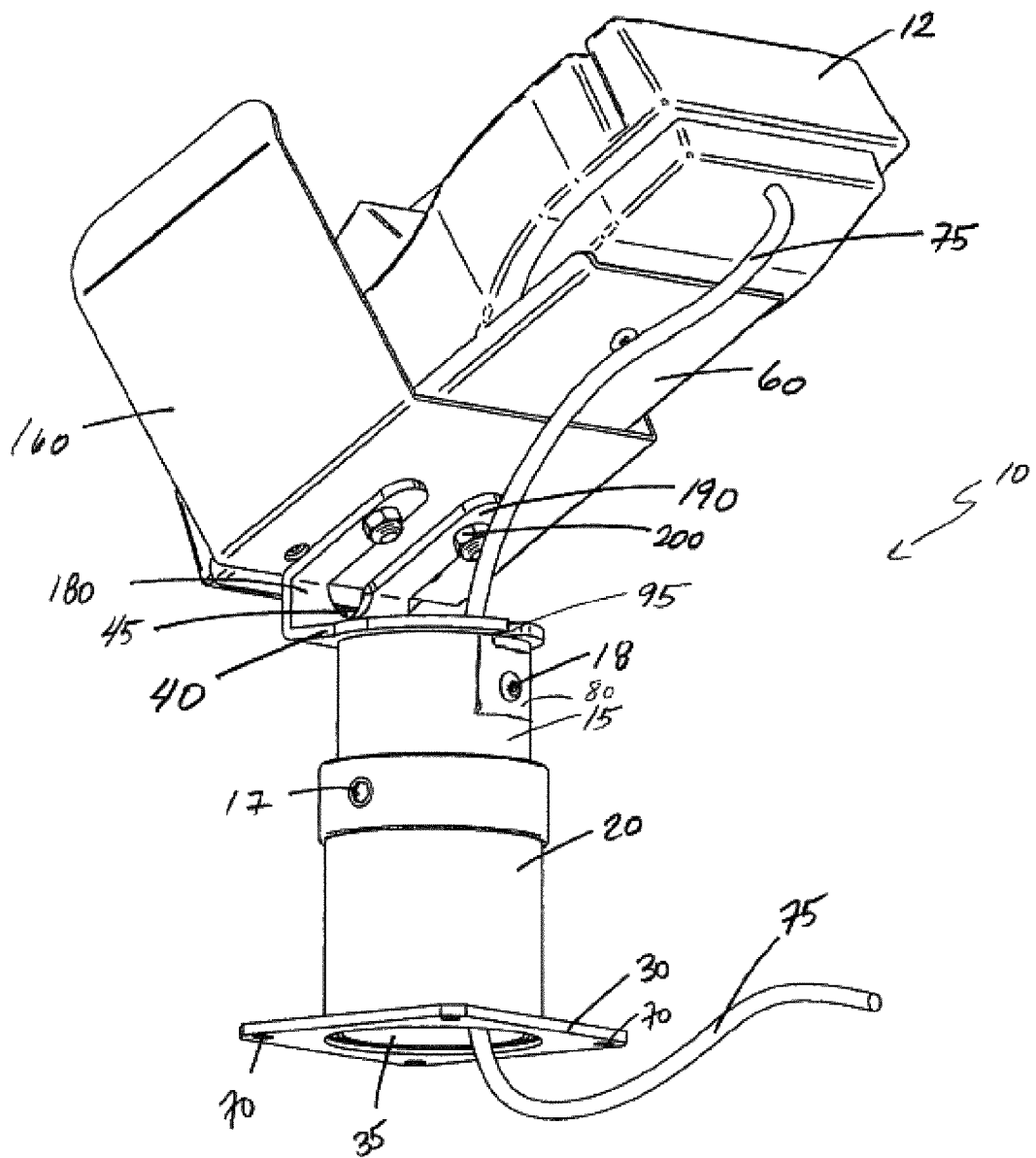
FIG. 3 shows a perspective view of an embodiment of a support stand for an information transfer device comprising an information transfer device.

Referring now to FIG. 3, there is shown a representative embodiment of the support stand for an information transfer device (10) with an information transfer device (12). The support stand (10) comprises mast (20) and telescoping insert (15) connected by set screw (17). Also shown is base member (30), base member apertures (70), hexagonal screw (18) for attaching the insert bracket (not shown) to the mast, rotatable member (40) providing for rotation of the information transfer device holder (60) that attaches to the rotatable member via one or more attachment points (190) and nuts (200) for securing threaded screws passing through from the IFT holder. Also shown is slot (95) that communicates with the second (cable-passing) aperture (not shown) to the periphery of the rotatable member. A second portion of the rotatable member (180) also comprises a slot therein (45) optionally for passage of cables or the like. Also shown in FIG. 3, is cable (75) that passes through a base member aperture (35) in base member (30). The cable also passes through the hollow mast, exists through second (cable-passing) aperture (not shown) in the rotatable member (40) and attaches to information transfer device (12). Security screens (160) extend on both sides of the IFT holder to provide security when information is entered into the IFT device.

Figure 4:
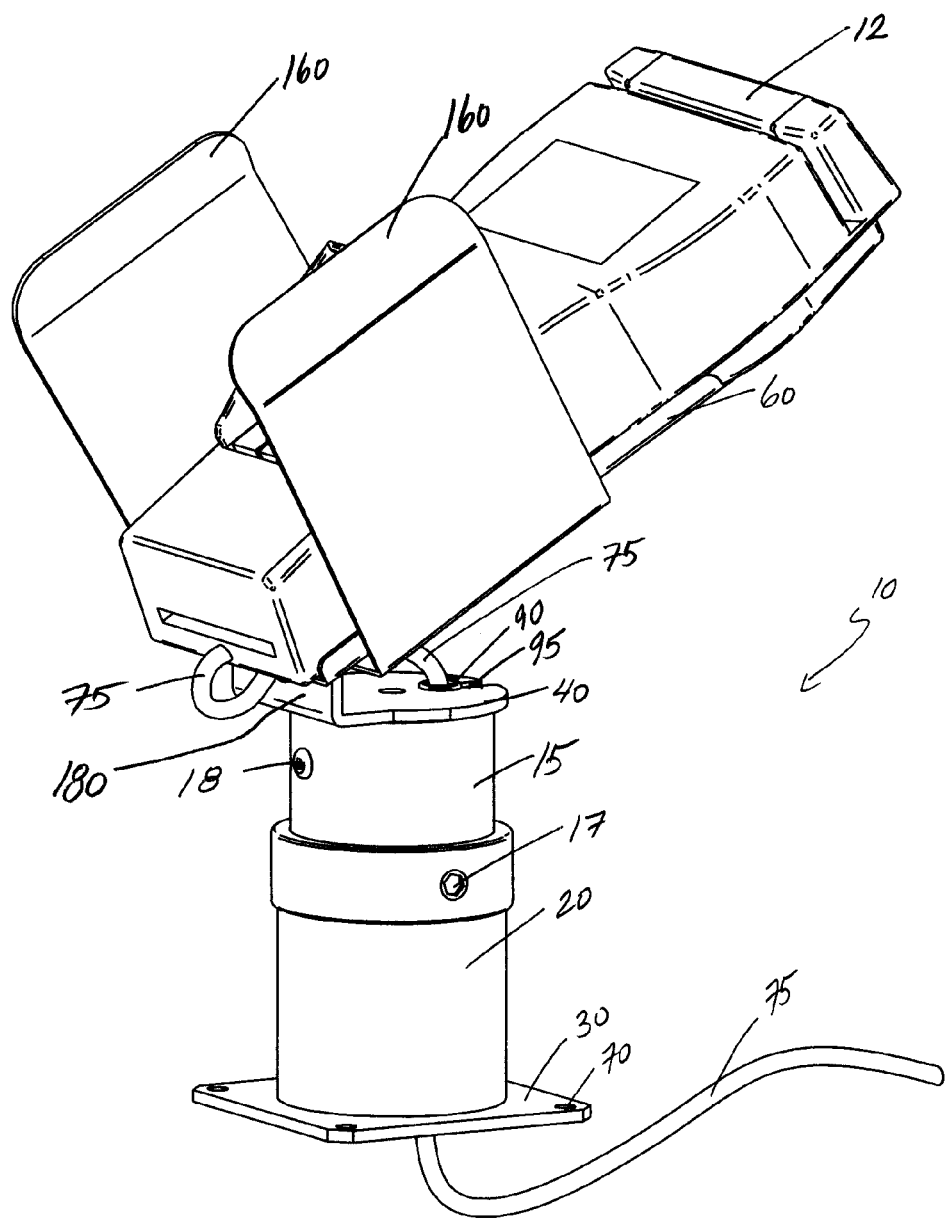
FIG. 4 shows a perspective view of an embodiment of a support stand for an information transfer device comprising an information transfer device.

Referring now to FIG. 4, there is shown a representative embodiment of the support stand for an information transfer device (10) with an information transfer device (12). The support stand (10) comprises mast (20) and telescoping insert (15) connected by set screw (17). Also shown is base member (30), base member apertures (70), hexagonal screw (18) for attaching the insert bracket (not shown) to the mast, rotatable member (40) providing for rotation of the information transfer device holder (60) security screens (160) and IFT device (12). Also shown is slot (95) that communicates with the second (cable-passing) aperture (90) to the periphery of the rotatable member, a second portion (180) of the rotatable member comprising a slot therein (not shown) for passage of cables or the like to the front of an IFT device. Also shown in FIG. 4, is cable (75) that passes through a base member aperture (not shown) in base member (30). The cable also passes through the hollow mast, exists through the rotatable member (40) via second aperture (90) and attaches to information transfer device (12). Security screens (160) extend on both sides of the IFT holder to provide security when information is entered into the IFT device.

Figure 5:
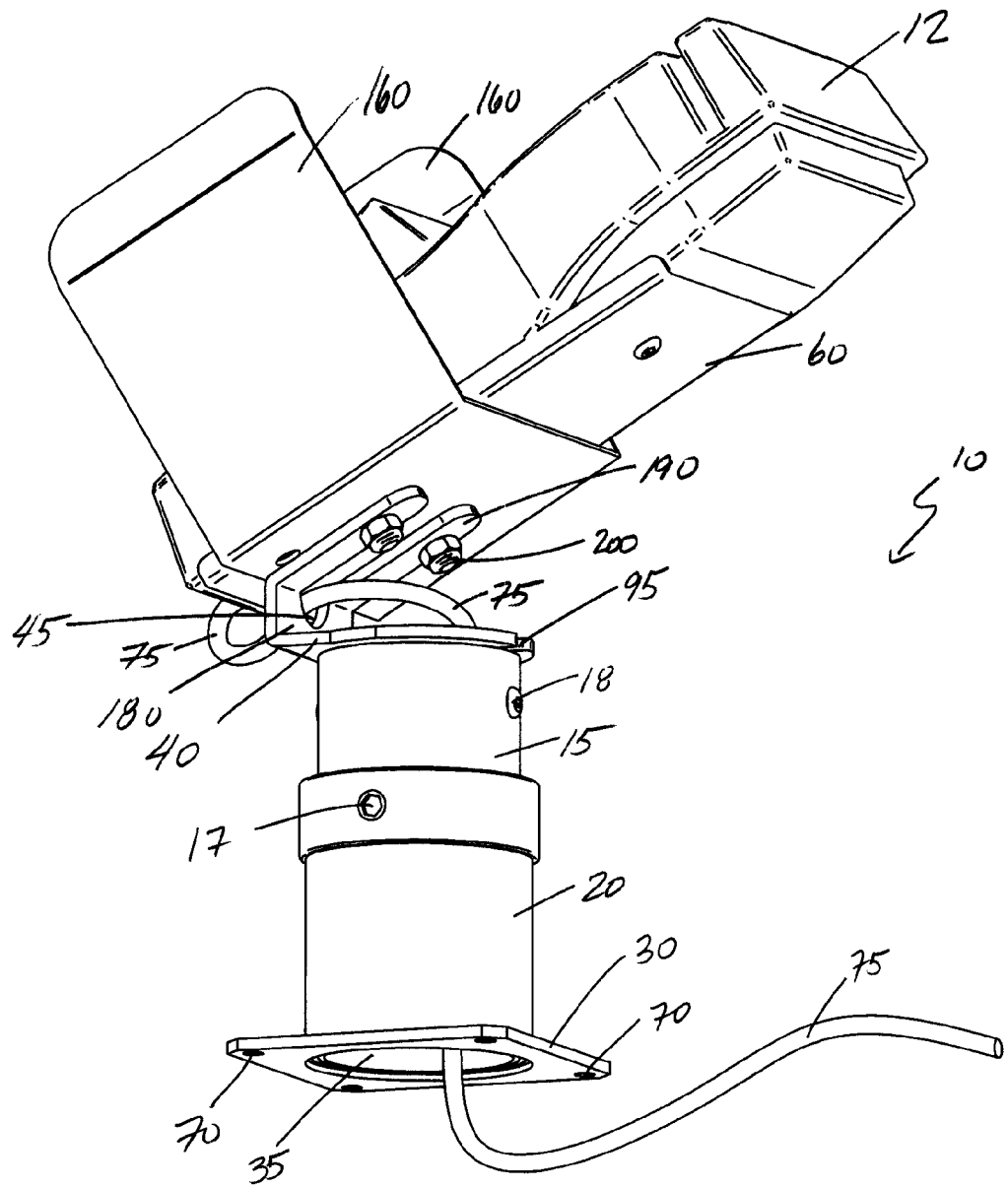
FIG. 5 shows a perspective view of an embodiment of a support stand for an information transfer device comprising an information transfer device.

FIG. 5 shows a similar embodiment to FIG. 3, except that cable (75) passes through through slot (45) in the second portion (180) of the rotatable member and attaches to the front of the IFT device (12).

Figure 6:
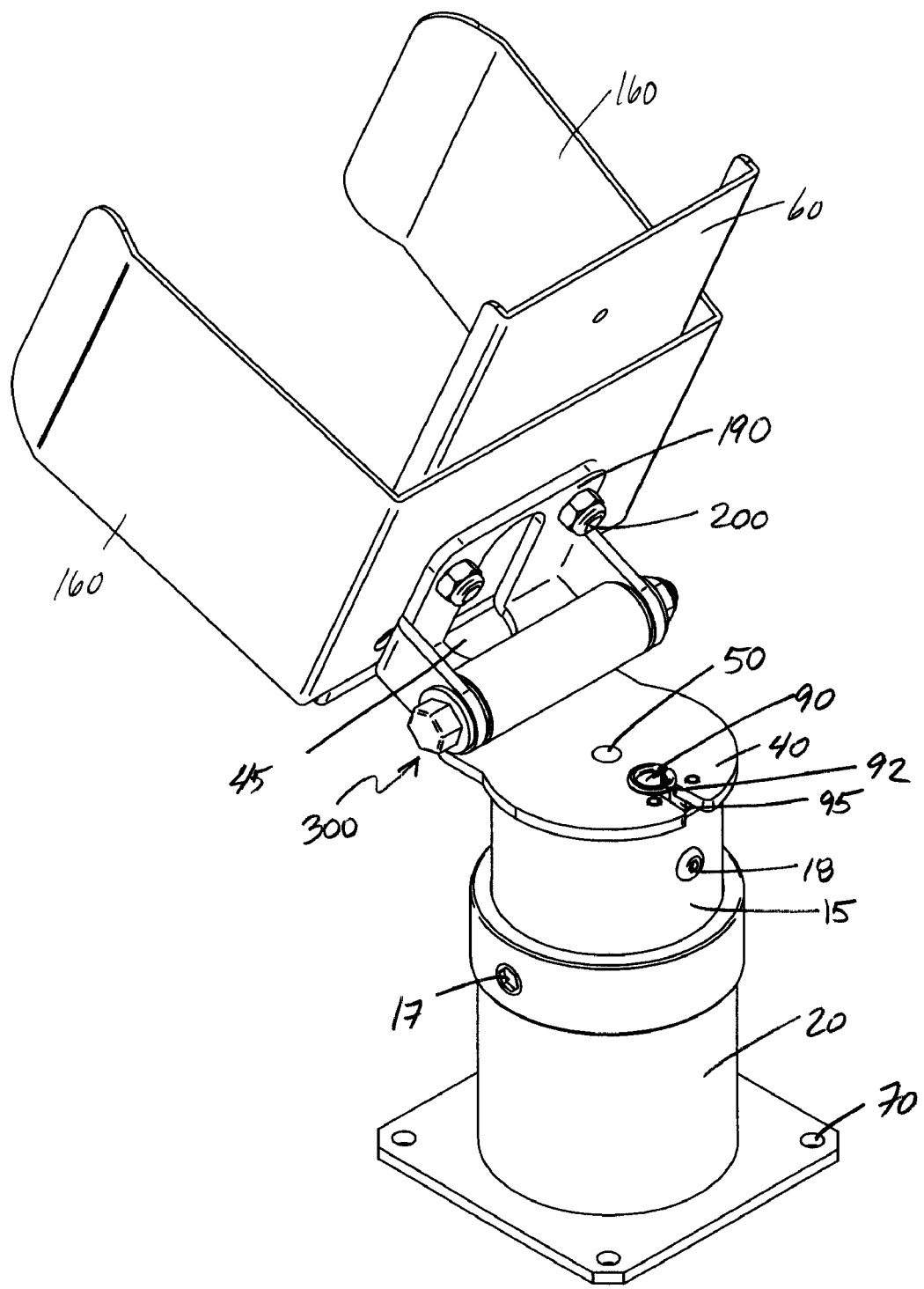
FIG. 6 shows a perspective view of an embodiment of a support stand for an information transfer device.

FIG. 6 shows an embodiment which is similar to FIG. 2 except that the rotatable member (40) further comprises a pivot or hinge means (300) for tilting a portion of the rotatable member and attached ITD holder through a defined angle of rotation. In the embodiment shown, the pivot or hinge means comprises a threaded bolt, a plurality of friction washers and a locking nut. Any other pivot or hinge means known in the art, may be employed to provide pivotal movement of the ITD holder.

Figure 7:
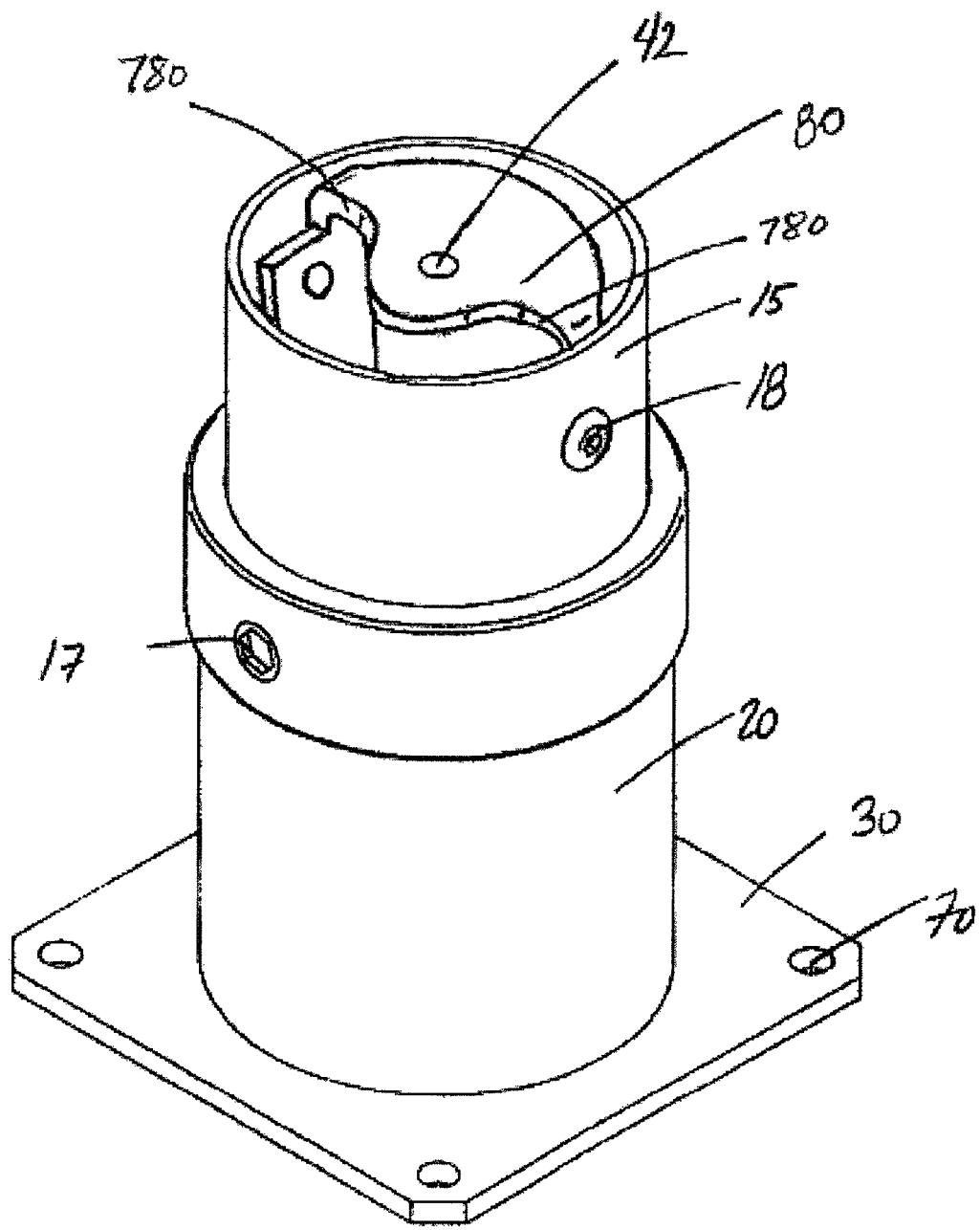
FIG. 7 shows an embodiment of a mast comprising a base member, the mast comprising an insert bracket attached therein.

Referring now to FIG. 7, there is shown a representative embodiment of a mast (20) comprising telescoping insert (15), the mast attached to base member (30) having a plurality of apertures (70) defined therein for securing the base member (30) to a suitable surface. Also shown is set screw (17), hexagonal screw (18) that attaches insert bracket (80) to an interior wall of the mast. The aperture (42) in insert bracket (80) receives connector means (not shown) for attaching the rotatable member.

Figure 8:
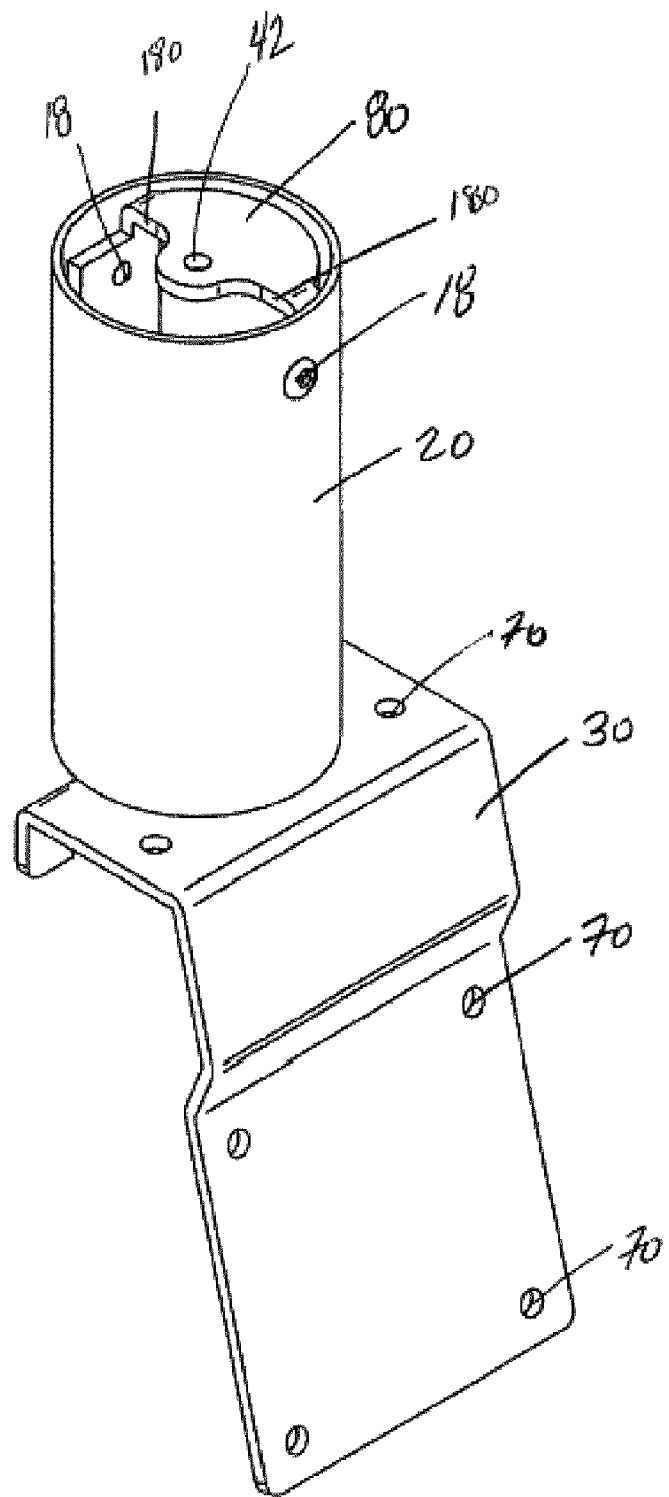
FIG. 8 shows an embodiment of a mast comprising a base member, the mast comprising an insert bracket attached therein.

Referring now to FIG. 8, there is shown a representative embodiment of a mast (20) comprising base member (30) having a plurality of apertures (70) defined therein for securing the base member (30) to a suitable surface, for example a side rail, counter, or both. Also shown is insert bracket (80) comprising aperture (42) for receiving a connector means (not shown). Insert bracket (80) is connected to the interior walls of mast (20) by screws (18).

Figure 9:
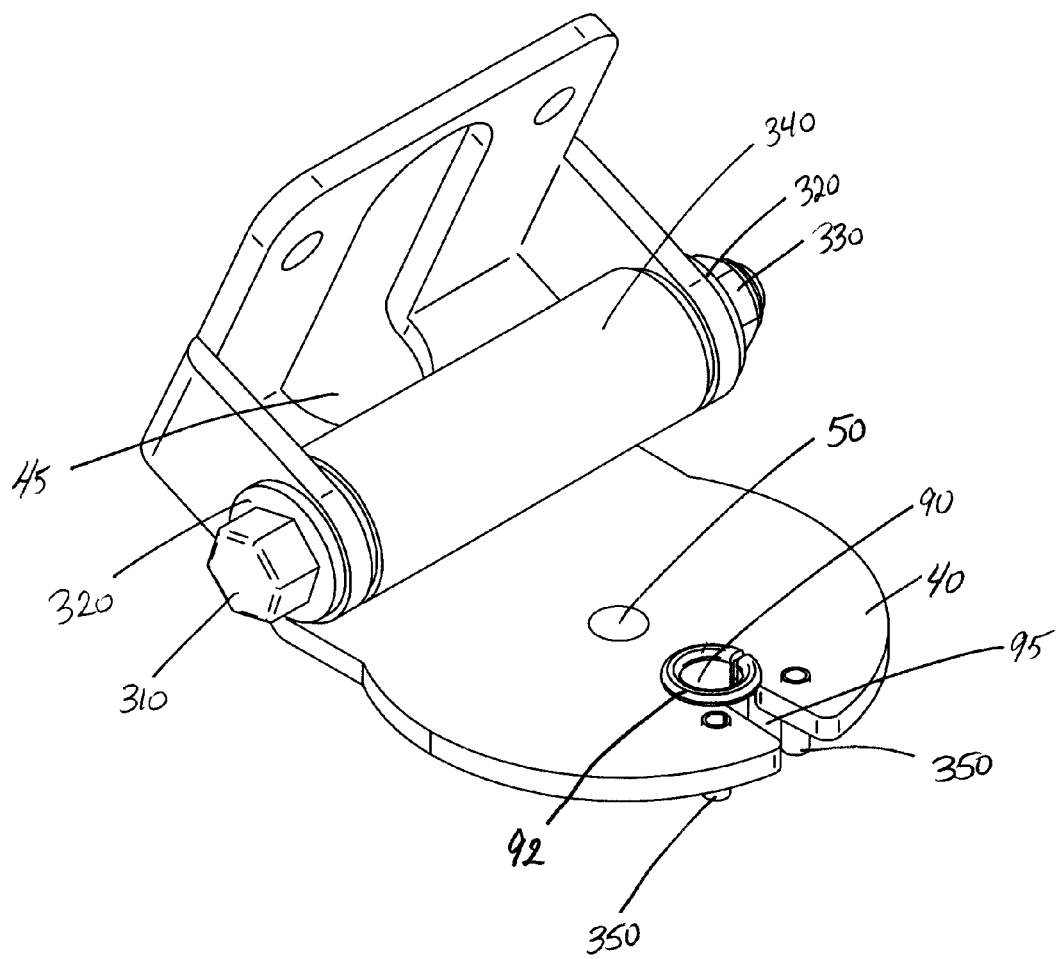
FIG. 9 shows an embodiment of a rotatable member comprising a hinge or pivot means permitting a portion of the rotatable member to be tilted.

Referring now to FIG. 9, there is shown an embodiment of a rotatable member (40) comprising aperture (50) for receiving a connector means, second (cable-passing) aperture (90) comprising removable grommet, slot (95) communicating with second aperture (90), removable grommet (92) pivot or hinge means comprising without wishing to be limiting, threaded bolt (310) washers (320) and locking nut (330). In the embodiment shown, which is not meant to be limiting in any manner, the threaded bolt (310) passes through a cylindrical housing that forms part of the rotatable member (40). Also shown are extending members (350) that extend into the mast to engage stopping members (780) therein (see also FIG. 7).

Figure 10:
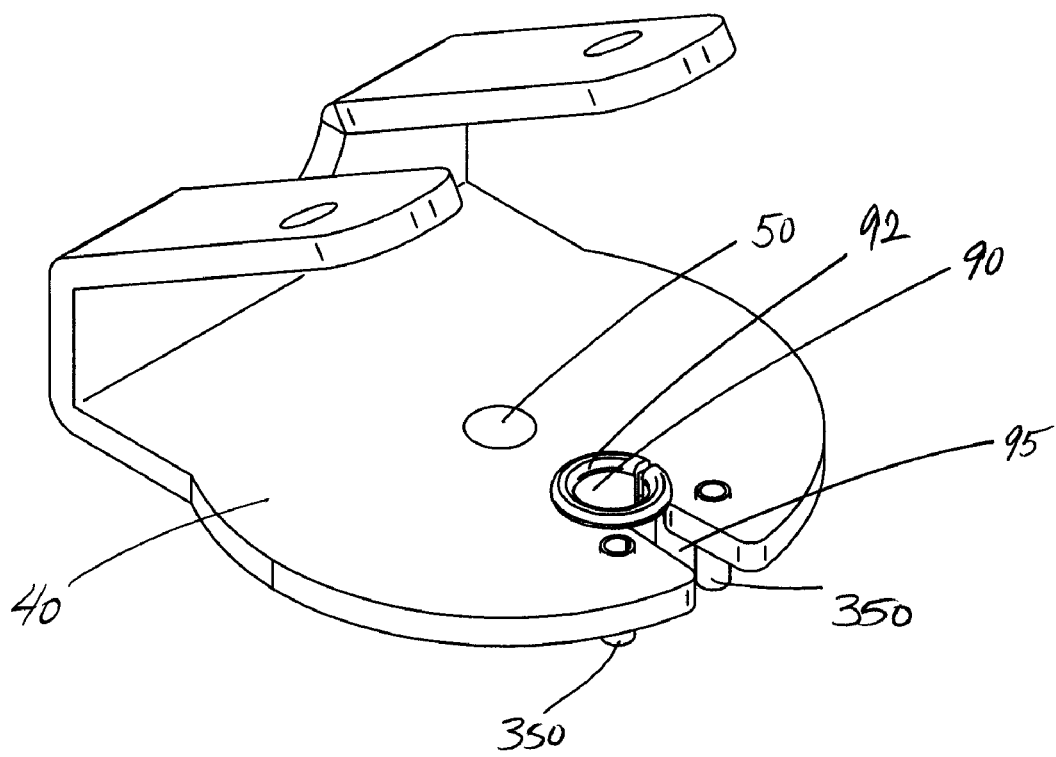
FIG. 10 shows an embodiment of a rotatable member without a hinge or pivot means.

Referring now to FIG. 10, there is shown an embodiment of a rotatable member (40) comprising aperture (50) for receiving connector means, second (cable passing) aperture (90) comprising removable grommet (92), slot (95) communicating with second aperture (90).

Figure 11:
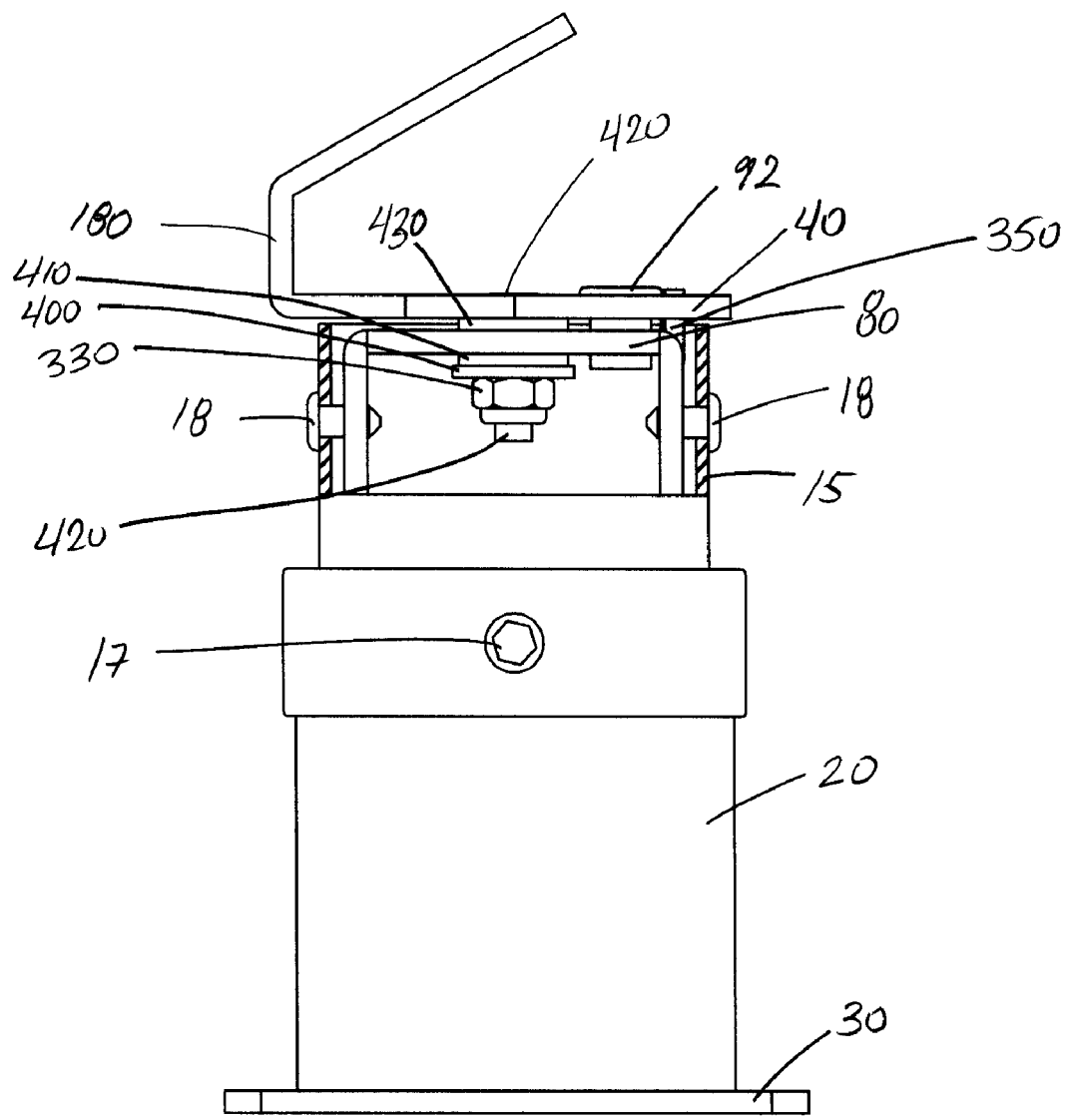
FIG. 11 shows a cross-sectional view of an embodiment of the mast with insert bracket attached to a rotatable member by connection means.

Referring now to FIG. 11, there is depicted a cross-sectional view showing mast (20), base member (30), telescoping insert (15), set screw (17), hexagonal screw (18) attaching insert bracket (80) to two interior walls of the mast. Without wishing to be limiting, connector means shown in the embodiment comprises first washer (400), second washer (410), third washer (430), threaded screw (420), and locking nut (330). Also shown in the embodiment is removable grommet (92) and extending member (350) that can abut a portion of the insert bracket (80) when rotatable member (40) is rotated through a defined angle of rotation.

Figure 12:
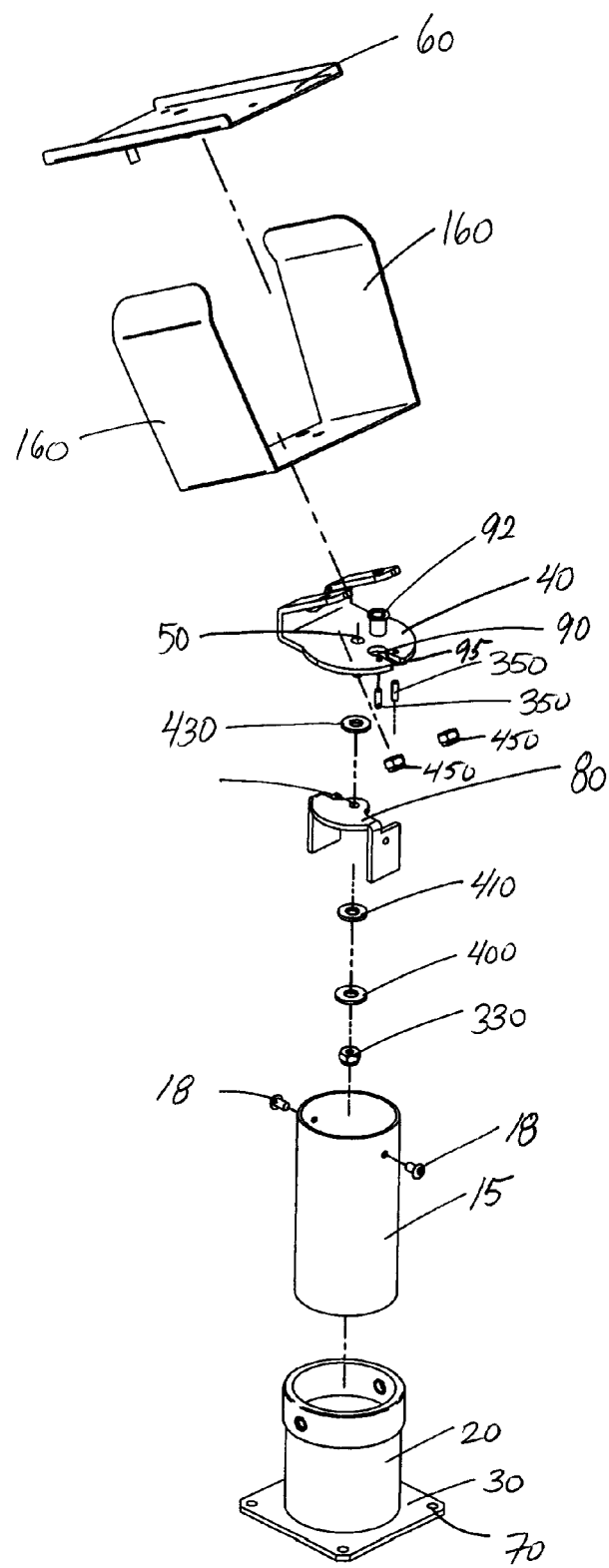
FIG. 12 shows an exploded view of an embodiment of a stand for an information transfer device.

Referring now to FIG. 12, there is shown an exploded view of a stand for an information transfer device comprising mast (20), base member (30) comprising apertures (70) therein, telescoping insert (15), and hexagonal screws (18). In the embodiment shown, which is not meant to be limiting in any manner, connector means comprises locking nut (330), first washer (400), second washer (410), third washer (430) for receiving a threaded screw or the like (not shown) that may pass through aperture (50) in the rotatable member (40) and connect to the insert bracket (80). The IFT holder (60) engages a member comprising two security shields (160) extending on each end therefrom. The holder and member comprising security screens is in turn attached to the rotatable member at suitable attachment points via two threaded screws (not shown) that are secured by nuts (450).

Figure 13:
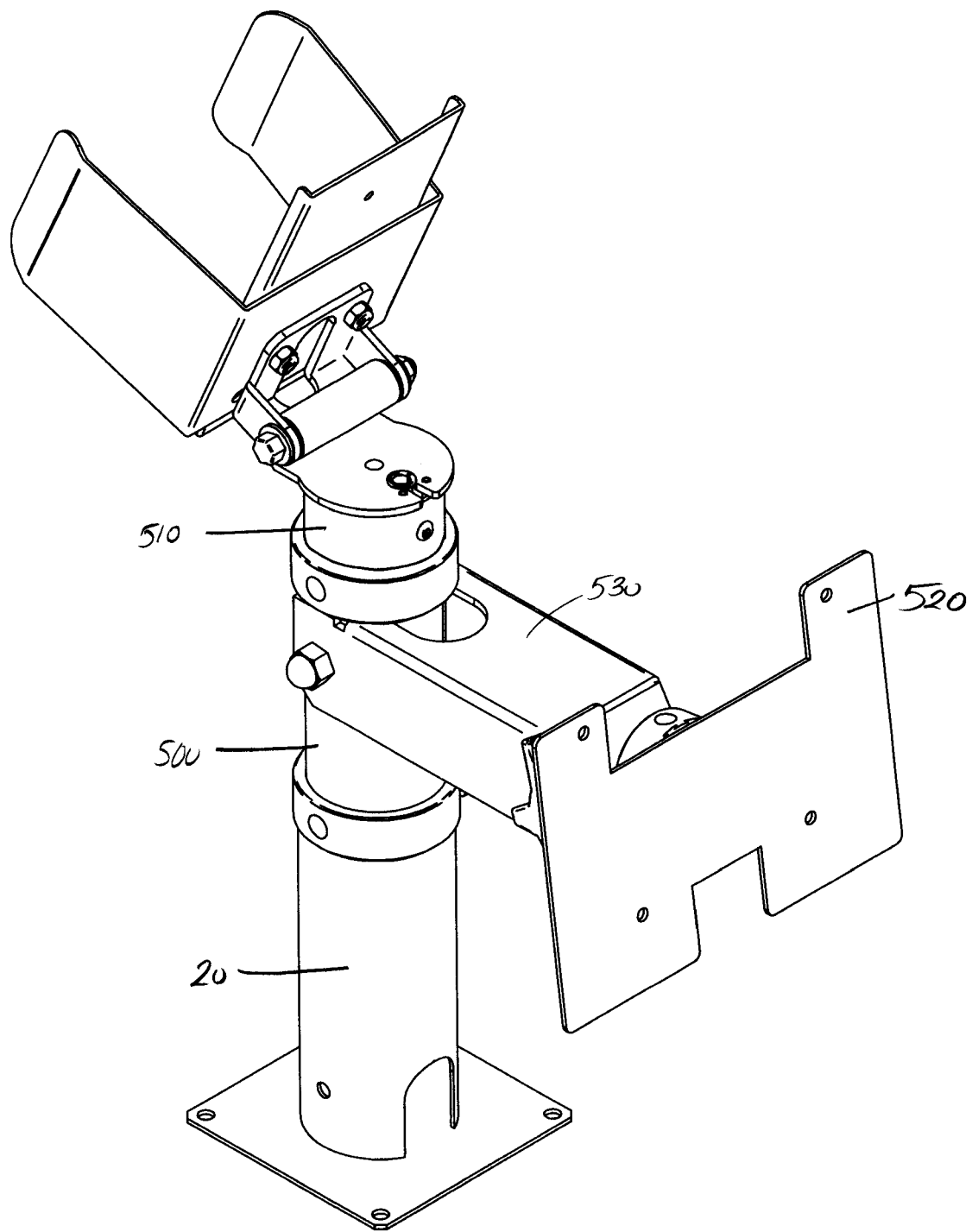
FIG. 13 shows a perspective view of an embodiment of a stand for an information transfer device.

Referring now to FIG. 13, there is shown an alternate embodiment of the present invention wherein the mast (20) comprises first telescoping insert (500), second telescoping insert (510) and additional base member (520), comprising extending member (530) attached to the first telescoping insert (500).

All citations are hereby incorporated by reference.

The present invention has been described with regard to one or more embodiments. However, it will be apparent to persons skilled in the art that a number of variations and modifications can be made without departing from the scope of the invention as defined in the claims.

What is claimed is:

1. A support stand for an information transfer device comprising,
   a hollow mast having a first end and a second end, said first end comprising an insert bracket attached to one or more interior walls of the mast, said second end comprising a base member for attachment to a surface,
   a rotatable member affixed to the hollow mast and secured to said insert bracket by a connector means, said rotatable member capable of rotational movement between a first position and a second position with respect to the insert bracket when the rotatable member is affixed and secured to the insert bracket by the connector means,
   the rotatable member comprising an information transfer device holder for supporting an information transfer device and a security shield for preventing unauthorized viewing of confidential information during input into the information transfer device, wherein the rotatable member is restricted to a defined angle of rotation by one or more bosses, protruding elements, or extending members that extend downwardly from the rotatable member and abut one or more portions of the insert bracket when the rotatable member is rotated from the first position to the second position.

2. The support stand of claim 1, wherein said base member comprises a
   substantially flat portion comprising a plurality of apertures for passage of securing means, and at
   least one other aperture for passage of one or more cables or wires.

3. The support stand of claim 1, wherein said mast and base member
   comprise a single continuous piece of material.

4. The support stand of claim 1, wherein said mast has a telescoping means for modulating the length of the mast.

5. The support stand of claim 1, wherein said insert bracket is attached in transverse orientation to the long axis of the mast at or near the end opposite the base member by one or more securing means.

6. The support stand of claim 5, wherein the connector means attaching the rotatable member to the insert bracket comprises a threaded screw, one or more nuts, one or more bolts, one or more spacers, one or more washers, or any combination thereof.

7. The support stand of claim 6, wherein the connector means passes through an aperture on each of the rotatable member and insert bracket, said rotatable member and insert bracket secured to each other by at least one locking nut and at least one friction washer.

8. The support stand of claim 1, wherein the rotatable member comprises a second aperture optionally comprising a removable plug or insert for passage of wires or cables through the rotatable member close to the axis of rotation thereof.

9. The support stand of claim 8, wherein said second aperture communicates with the periphery of the rotatable member via a slot.

10. The support stand of claim 1, wherein said one or more bosses, protruding elements, or extending members engage one or more stopping members in the mast.

11. The support stand of claim 1, wherein the rotatable member comprises one or more screws that extend downwardly into the hollow mast, the screws abutting one or more portions of the insert bracket when the rotatable member is rotated through a defined angle of rotation.

12. The support stand of claim 1, wherein the rotatable member comprises an information transfer device holder defining a slot comprising a back portion, a first side portion, a second side portion, a bottom portion and a front portion.

13. The support stand of claim 12, further comprising a security shield attached thereto.

14. The support stand of claim 1, wherein the rotatable member comprise a pivot or hinge means for tilting the rotatable member through a defined angle of rotation.

15. A support stand for an information transfer device comprising,
   a rigid, substantially cylindrical hollow mast having a first end and a second end, said first end comprising an insert bracket attached to two interior walls at about opposite positions along the diameter of the mast, and a second end comprising a base member for attachment to a surface, said base member comprising a substantially flat portion with one or more apertures for receiving one or more securing means, and at least one separate aperture for the passage of one or more cables;

a rotatable member comprising a grommeted aperture or removable plug for passage of one or more cables from the interior of the mast to the information transfer device;

said rotatable member affixed exterior the hollow mast and secured to the insert bracket by a connection means, said connection means comprising a threaded screw, one or more locking nuts, bolts, washers, spacers, or any combination thereof, and wherein the threaded screw passes through an aperture in the rotatable member such that said member is provided with rotational movement between a first position and a second position, the rotatable member comprising attachment points attaching a slotted information transfer device holder for supporting an information transfer device, said holder comprising a back portion, three side portions, a front portion and further comprising an attachable shield for preventing unauthorized viewing of confidential information during input into the information transfer device and wherein said rotatable member is restricted to a defined angle of rotation by one or more bosses, protruding elements, or extending members that extend downwardly from the rotatable member and abut one or more portions of the insert bracket when the rotatable member is rotated from the first position to the second position.

\* \* \* \* \*